United States Patent
Holley et al.

(10) Patent No.: US 10,627,111 B2
(45) Date of Patent: Apr. 21, 2020

(54) ROTATING DETONATION ENGINE MULTI-STAGE MIXER

(71) Applicant: UNITED TECHNOLOGIES CORPORATION, Farmington, CT (US)

(72) Inventors: Adam Takashi Holley, Manchester, CT (US); Christopher Britton Greene, East Hartford, CT (US); Peter A T Cocks, East Hartford, CT (US)

(73) Assignee: UNITED TECHNOLOGIES COPRORATION, Farmington, CT (US)

( * ) Notice: Subject to any disclaimer, the term of this patent is extended or adjusted under 35 U.S.C. 154(b) by 413 days.

(21) Appl. No.: 15/470,770

(22) Filed: Mar. 27, 2017

(65) Prior Publication Data

US 2018/0274439 A1    Sep. 27, 2018

(51) Int. Cl.
*F23R 7/00*    (2006.01)
*F02C 5/02*    (2006.01)
(Continued)

(52) U.S. Cl.
CPC ............... *F23R 7/00* (2013.01); *F02C 5/02* (2013.01); *F02K 7/00* (2013.01); *F23R 3/286* (2013.01);
(Continued)

(58) Field of Classification Search
CPC .... F23R 7/00; F23R 3/56; F23R 3/286; F23R 3/346; F02K 7/00; F05D 2240/35; F05D 2240/36; F02C 5/02
See application file for complete search history.

(56) References Cited

U.S. PATENT DOCUMENTS

| | | | | |
|---|---|---|---|---|
| 2,480,626 A | * | 8/1949 | Bodine, Jr. | ............... F02K 7/06 220/2.3 R |
| 3,423,942 A | * | 1/1969 | Spindler | .................. F02K 9/97 60/207 |

(Continued)

FOREIGN PATENT DOCUMENTS

| | | |
|---|---|---|
| CN | 103423031 | 12/2013 |
| DE | 102013216398 | 2/2015 |

(Continued)

OTHER PUBLICATIONS

Fotia et al "Experimental Study of the Performance of a Rotating Detonation Engine with Nozzle", Journal of Propulsion and Power, vol. 32, No. 3, May-Jun. 2016, pp. 674-681 (Year: 2016).*

(Continued)

*Primary Examiner* — Ted Kim

(57) ABSTRACT

A fuel mixer for mixing a fuel and an oxidizer prior to detonation in a rotating detonation engine includes a combustion channel configured to transport a final mixture of the fuel and the oxidizer for combustion. The fuel mixer also includes a mixture channel positioned upstream from the combustion channel and configured to transport a first mixture having at least some of the fuel and at least some of the oxidizer. The fuel mixer also includes a secondary outlet positioned upstream from the combustion channel and configured to output a supplemental mixture of the fuel and the oxidizer that includes at least one of the fuel or the oxidizer such that the first mixture and the supplemental mixture combine in the combustion channel to form the final mixture.

17 Claims, 7 Drawing Sheets

(51) Int. Cl.
*F23R 3/34* (2006.01)
*F23R 3/28* (2006.01)
*F02K 7/00* (2006.01)

(52) U.S. Cl.
CPC .......... *F23R 3/346* (2013.01); *F05D 2240/35* (2013.01); *F05D 2240/36* (2013.01)

(56) References Cited

U.S. PATENT DOCUMENTS

| | | | |
|---|---|---|---|
| 5,345,758 A * | 9/1994 | Bussing | B01J 3/08 60/39.38 |
| 5,473,885 A | 12/1995 | Hunter, Jr. et al. | |
| 5,579,633 A * | 12/1996 | Hunter, Jr. | C10J 3/08 60/204 |
| 6,293,235 B1 | 9/2001 | Cobb, Jr. | |
| 6,460,494 B1 | 10/2002 | Cobb, Jr. | |
| 6,883,543 B2 | 4/2005 | Tew et al. | |
| 7,739,867 B2 | 6/2010 | Kenyon et al. | |
| 8,544,280 B2 | 10/2013 | Lu et al. | |
| 8,650,856 B2 | 2/2014 | Brumberg et al. | |
| 8,683,780 B2 | 4/2014 | Shimo et al. | |
| 8,707,674 B2 | 4/2014 | Moscinski et al. | |
| 8,893,467 B2 | 11/2014 | Nalim et al. | |
| 9,021,783 B2 | 5/2015 | Hill et al. | |
| 9,046,058 B2 | 6/2015 | Claflin | |
| 9,512,805 B2 | 12/2016 | Snyder | |
| 9,556,794 B2 | 1/2017 | Falempin et al. | |
| 9,732,670 B2 | 8/2017 | Joshi | |
| 2002/0068250 A1 * | 6/2002 | Nalim | F02C 3/02 431/181 |
| 2005/0079461 A1 * | 4/2005 | Kasahara | F02K 7/06 431/181 |
| 2005/0112516 A1 * | 5/2005 | Aarnio | B08B 7/0007 431/1 |
| 2006/0260291 A1 * | 11/2006 | Vandervort | F02C 5/00 60/39.76 |
| 2009/0139203 A1 * | 6/2009 | Rasheed | F02C 5/02 60/247 |
| 2011/0005195 A1 | 1/2011 | Mungas | |
| 2012/0227411 A1 * | 9/2012 | Carroni | F23L 7/00 60/775 |
| 2013/0025256 A1 | 1/2013 | Lu et al. | |
| 2014/0182295 A1 | 7/2014 | Falempin | |
| 2014/0260294 A1 * | 9/2014 | Farshchian | F23N 5/00 60/773 |
| 2015/0167544 A1 * | 6/2015 | Joshi | F23R 7/00 123/205 |
| 2015/0300630 A1 | 10/2015 | Juan | |
| 2015/0308348 A1 | 10/2015 | Minick | |
| 2018/0080412 A1 * | 3/2018 | Mizener | F02K 7/04 |
| 2018/0180289 A1 * | 6/2018 | Lavertu, Jr. | F23R 7/00 |

FOREIGN PATENT DOCUMENTS

| | | |
|---|---|---|
| EP | 2261559 | 12/2010 |
| RU | 2585328 | 8/2015 |

OTHER PUBLICATIONS

USPTO, Non-Final Office Action dated Nov. 19, 2018 in U.S. Appl. No. 14/470,783.
Rankin, Brent A. et al; "*Imaging of OH\* Chemiluminescence in an Optically Accessible Nonpremixed Rotating Detonation Engine*"; 53$^{rd}$ American Institute of Aeronautics and Astronautics Aerospace Sciences Meeting, Jan. 2015; 16 pages.
Holley et al., U.S. Appl. No. 15/470,783, filed Mar. 27, 2017 and entitled Rotating Detonation Engine Upstream Wave Arrestor.
Greene et al., U.S. Appl. No. 15/470,796, filed Mar. 27, 2017 and entitled Rotating Detonation Engine Combustor Wave Reflector.
Greene et al., U.S. Appl. No. 15/470,800, filed Mar. 27, 2017 and entitled Rotating Detonation Engine wave induced mixer.
USPTO, Notice of Allowance dated Jun. 6, 2019 in U.S. Appl. No. 14/470,783.
USPTO, Restriction/Election Requirement dated Jun. 19, 2019 in U.S. Appl. No. 15/470,796.
USPTO, Restriction/Election Requirement dated Jul. 23, 2019 in U.S. Appl. No. 15/470,800.
USPTO, Supplemental Notice of Allowance dated Sep. 5, 2019 in U.S. Appl. No. 14/470,783.
USPTO, Restriction/Election Requirement dated Oct. 8, 2019 in U.S. Appl. No. 15/470,796.
USPTO, Restriction/Election Requirement dated Oct. 28, 2019 in U.S. Appl. No. 15/470,800.

\* cited by examiner

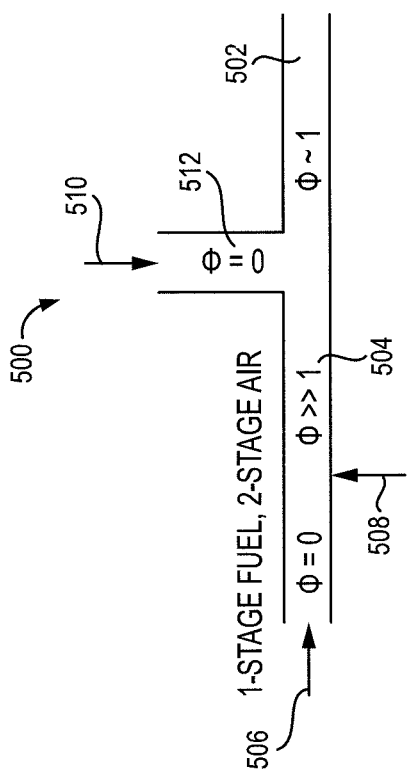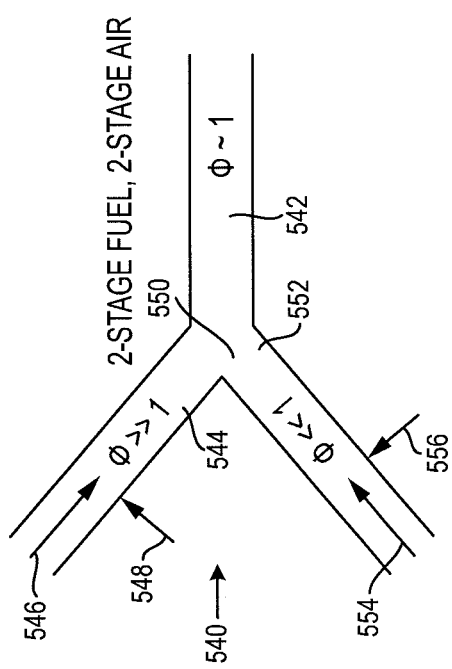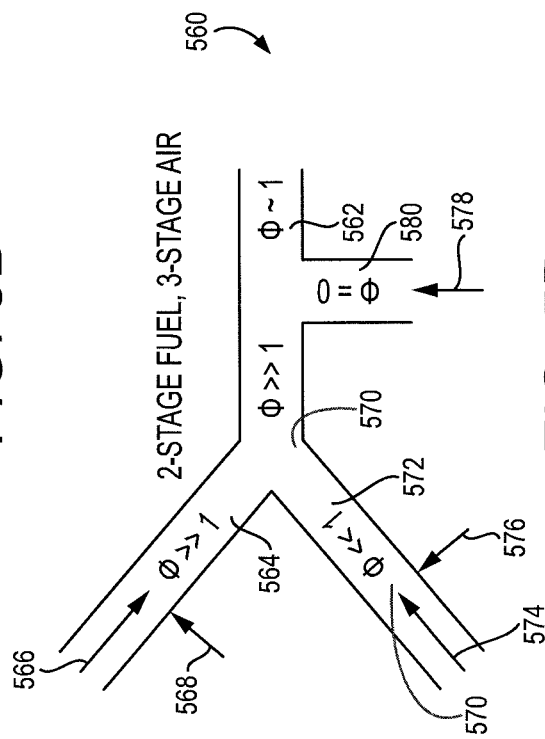

ROTATING DETONATION ENGINE MULTI-STAGE MIXER

GOVERNMENT LICENSE RIGHTS

This disclosure was made with government support under contract N68936-15-C-0012 and awarded by the United States Defense Advanced Research Projects Agency. The government has certain rights in the disclosure.

FIELD

The present disclosure is directed to rotating detonation engines and, more particularly, to fuel and oxidizer mixers for providing a mixture of fuel and oxidizer for detonation in a rotating detonation engine.

BACKGROUND

Gas turbine engines include a compressor section, a turbine section, and a combustor section. The compressor section receives air from the environment and uses various rotors and stators to compress the air. The combustor section receives the compressed air and fuel, mixes the compressed air and fuel, and combusts the mixture to generate thrust. Exhaust from the combustor section is received by the turbine section which converts the exhaust into torque, some of which may be transferred to the compressor section. Recently, various entities have begun researching use of rotating detonation engines as combustors for gas turbine engines and other direct thrust applications such as ramjet and augmentor combustors. Such rotating detonation engines operate based on a mixture of an oxidizer and a fuel. It is desirable for the oxidizer and the fuel to be well-mixed prior to detonation.

SUMMARY

Disclosed herein is a fuel mixer for mixing a fuel and an oxidizer prior to detonation in a rotating detonation engine. The fuel mixer includes a combustion channel configured to fill with a final mixture of the fuel and the oxidizer for combustion. The fuel mixer also includes a mixture channel positioned upstream from the combustion channel and configured to transport a first mixture having at least some of the fuel and at least some of the oxidizer. The fuel mixer also includes a secondary outlet positioned upstream from the combustion channel and configured to output a supplemental mixture of the fuel and the oxidizer that includes at least one of the fuel or the oxidizer such that the first mixture and the supplemental mixture combine in the combustion channel to form the final mixture.

In any of the foregoing embodiments, the first mixture has a first fuel-air equivalence ratio that is greater than or less than 1 and the final mixture has a second fuel-air equivalence ratio that is closer to 1 than the first fuel-air equivalence ratio.

In any of the foregoing embodiments, the combustion channel is defined by an annulus of the rotating detonation engine.

In any of the foregoing embodiments, the combustion channel provides a volume for the final mixture to be combined prior to circumferential passage of a detonation.

In any of the foregoing embodiments, the mixture channel is positioned upstream from the secondary outlet, the first mixture has a first fuel-air equivalence ratio, and a difference between the first fuel-air equivalence ratio and 1 is sufficiently great that the first mixture fails to detonate upstream from the secondary outlet.

Any of the foregoing embodiments may further include a first oxidizer outlet configured to provide at least some of the oxidizer to the mixture channel, and a first fuel outlet configured to provide at least some of the fuel to the mixture channel.

Any of the foregoing embodiments may further include at least one tertiary outlet positioned upstream from the combustion channel and configured to transport at least one tertiary mixture of the fuel and the oxidizer that includes at least one of the fuel or the oxidizer such that the first mixture, the supplemental mixture, and the tertiary mixture combine in the combustion channel to form the final mixture.

In any of the foregoing embodiments, the first mixture has a first fuel-air equivalence ratio that is selected based on a combination of an oxidizer type of the oxidizer, a fuel type of the fuel, a pressure experienced at the mixture channel, and a temperature experienced at the mixture channel.

Also disclosed is a rotating detonation engine. The rotating detonation engine includes an annulus configured to receive a final mixture of a fuel and an oxidizer for rotating detonation. The rotating detonation engine further includes a combustion channel configured to fill with the final mixture of the fuel and the oxidizer for combustion. The rotating detonation engine further includes a mixture channel positioned upstream from the combustion channel and configured to transport a first mixture having at least some of the fuel and at least some of the oxidizer. The rotating detonation engine further includes a secondary outlet positioned upstream from the combustion channel and configured to output a supplemental mixture of the fuel and the oxidizer that includes at least one of the fuel or the oxidizer such that the first mixture and the supplemental mixture combine in the combustion channel to form the final mixture.

In any of the foregoing embodiments, the first mixture has a first fuel-air equivalence ratio that is greater than or less than 1 and the final mixture has a second fuel-air equivalence ratio that is closer to 1 than the first fuel-air equivalence ratio.

In any of the foregoing embodiments, the combustion channel is defined by the annulus of the rotating detonation engine.

In any of the foregoing embodiments, the combustion channel provides a volume for the final mixture to be combined prior to circumferential passage of a detonation.

In any of the foregoing embodiments, the mixture channel is positioned upstream from the secondary outlet, the first mixture has a first fuel-air equivalence ratio, and a difference between the first fuel-air equivalence ratio and 1 is sufficiently great that the first mixture fails to detonate upstream from the secondary outlet.

Any of the foregoing embodiments may also include a first oxidizer outlet configured to provide at least some of the oxidizer to the mixture channel, and a first fuel outlet configured to provide at least some of the fuel to the mixture channel.

Any of the foregoing embodiments may also include at least one tertiary outlet positioned upstream from the combustion channel and configured to transport at least one tertiary mixture of the fuel and the oxidizer that includes at least one of the fuel or the oxidizer such that the first mixture, the supplemental mixture, and the tertiary mixture combine in the combustion channel to form the final mixture.

In any of the foregoing embodiments, the first mixture has a first fuel-air equivalence ratio that is determined based on an oxidizer type of the oxidizer, a fuel type of the fuel, a pressure experienced at the mixture channel, and a temperature experienced at the mixture channel.

Also disclosed is a gas turbine engine. The gas turbine engine includes a turbine section configured to convert exhaust into torque. The gas turbine engine also includes a compressor section configured receive the torque from the turbine section and to utilize the torque to compress fluid. The gas turbine engine also includes a rotating detonation engine configured to generate the exhaust. The rotating detonation engine includes an annulus configured to receive a final mixture of a fuel and an oxidizer for rotating detonation. The rotating detonation engine also includes a combustion channel configured to fill with the final mixture of the fuel and the oxidizer for combustion. The rotating detonation engine also includes a mixture channel positioned upstream from the combustion channel and configured to transport a first mixture having at least some of the fuel and at least some of the oxidizer. The rotating detonation engine also includes a secondary outlet positioned upstream from the combustion channel and configured to output a supplemental mixture of the fuel and the oxidizer that includes at least one of the fuel or the oxidizer such that the first mixture and the supplemental mixture combine in the combustion channel to form the final mixture.

In any of the foregoing embodiments, the mixture channel is positioned upstream from the secondary outlet, the first mixture has a first fuel-air equivalence ratio, and a difference between the first fuel-air equivalence ratio and 1 is sufficiently great that the first mixture fails to detonate upstream from the secondary outlet.

In any of the foregoing embodiments, the rotating detonation engine further includes a first oxidizer outlet configured to provide at least some of the oxidizer to the mixture channel, and a first fuel outlet configured to provide at least some of the fuel to the mixture channel.

In any of the foregoing embodiments, the rotating detonation engine further includes at least one tertiary outlet positioned upstream from the combustion channel and configured to transport at least one tertiary mixture of the fuel and the oxidizer that includes at least one of the fuel or the oxidizer such that the first mixture, the supplemental mixture, and the tertiary mixture combine in the combustion channel to form the final mixture.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed, non-limiting, embodiments. The drawings that accompany the detailed description can be briefly described as follows:

FIGS. 5A, 5B, 5C, and 5D are drawings illustrating various fuel mixers for use in rotating detonation engines, in accordance with various embodiments.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

As used herein, "aft" refers to the direction associated with the exhaust (e.g., the back end) of a gas turbine engine. As used herein, "forward" refers to the direction associated with the intake (e.g., the front end) of a gas turbine engine.

As used herein, "radially outward" refers to the direction generally away from the axis of rotation of a turbine engine. As used herein, "radially inward" refers to the direction generally towards the axis of rotation of a turbine engine.

Figure 1:
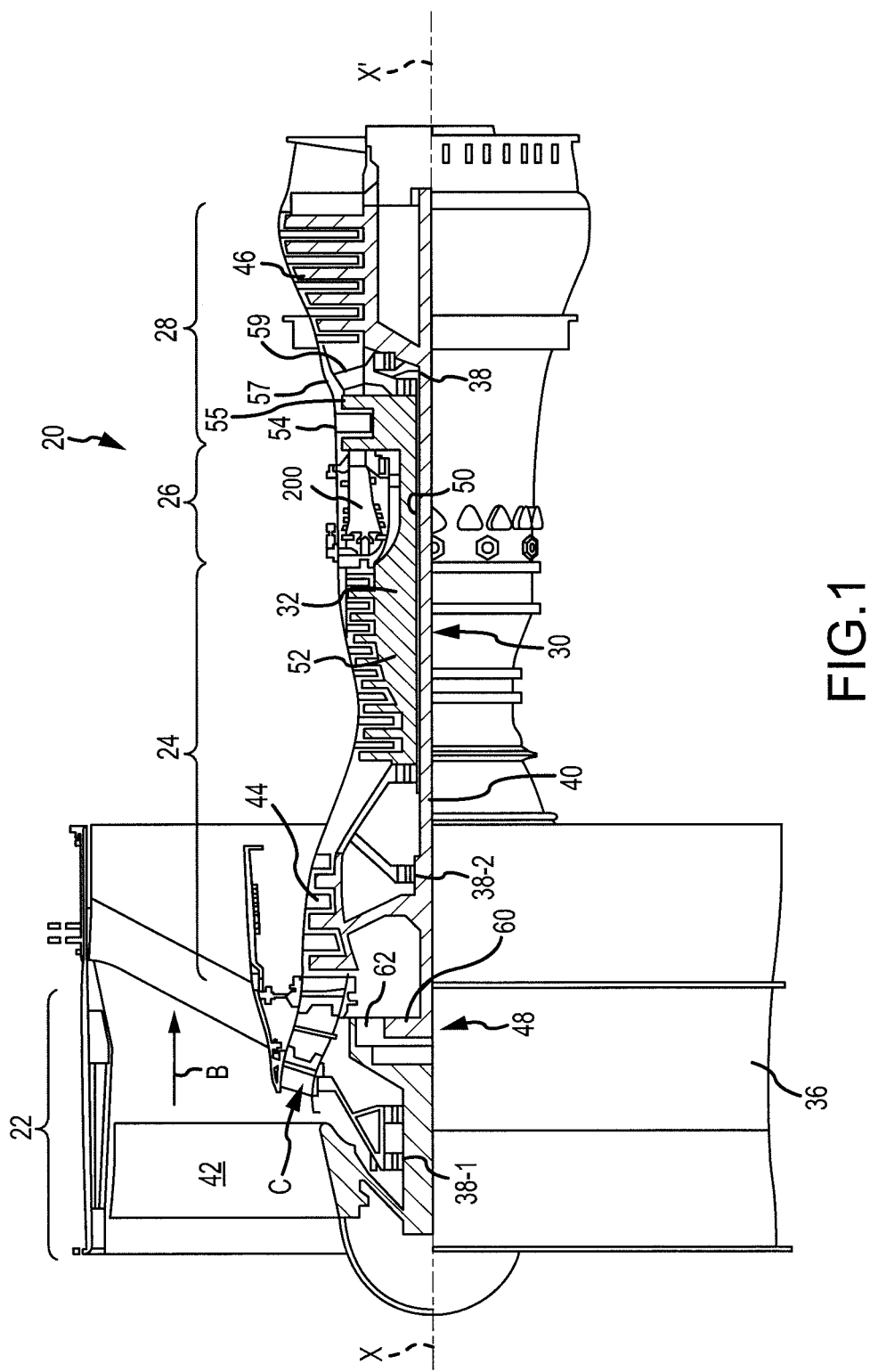
FIG. 1 is a schematic cross-section of a gas turbine engine, in accordance with various embodiments.

In various embodiments and with reference to FIG. 1, a gas turbine engine 20 is provided. The gas turbine engine 20 may be a two-spool turbofan that generally incorporates a fan section 22, a compressor section 24, a combustor section 26 and a turbine section 28. Alternative engines may include, for example, an augmentor section among other systems or features. In operation, the fan section 22 can drive coolant (e.g., air) along a bypass flow path B while the compressor section 24 can drive coolant along a core flow path C for compression and communication into the combustor section 26 then expansion through the turbine section 28. Although depicted as a two-spool turbofan gas turbine engine 20 herein, it should be understood that the concepts described herein are not limited to use with two-spool turbofans as the teachings may be applied to other types of turbine engines including turbojet, turboprop, turboshaft, or power generation turbines, with or without geared fan, geared compressor or three-spool architectures.

The gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. It should be understood that various bearing systems 38 at various locations may alternatively or additionally be provided, including for example, the bearing system 38, the bearing system 38-1, and the bearing system 38-2.

The low speed spool 30 may generally comprise an inner shaft 40 that interconnects a fan 42, a low pressure compressor 44 and a low pressure turbine 46. The inner shaft 40 may be connected to the fan 42 through a geared architecture 48 that can drive the fan 42 at a lower speed than the low speed spool 30. The geared architecture 48 may comprise a gear assembly 60 enclosed within a gear housing 62. The gear assembly 60 couples the inner shaft 40 to a rotating fan structure. The high speed spool 32 may comprise an outer shaft 50 that interconnects a high pressure compressor 52 and high pressure turbine 54. A rotating detonation engine 200 may be located between high pressure compressor 52 and high pressure turbine 54. A mid-turbine frame 57 of the engine static structure 36 may be located generally between the high pressure turbine 54 and the low pressure turbine 46. Mid-turbine frame 57 may support one or more bearing systems 38 in the turbine section 28. The inner shaft 40 and the outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The airflow of core flow path C may be compressed by the low pressure compressor 44 then the high pressure compressor 52, mixed and burned with fuel in the rotating detonation engine 200, then expanded over the high pressure turbine 54 and the low pressure turbine 46. The turbines 46, 54 rotationally drive the respective low speed spool 30 and high speed spool 32 in response to the expansion.

The gas turbine engine 20 may be, for example, a high-bypass ratio geared engine. In various embodiments, the bypass ratio of the gas turbine engine 20 may be greater than about six (6). In various embodiments, the bypass ratio of the gas turbine engine 20 may be greater than ten (10). In various embodiments, the geared architecture 48 may be an epicyclic gear train, such as a star gear system (sun gear in meshing engagement with a plurality of star gears supported by a carrier and in meshing engagement with a ring gear) or other gear system. The geared architecture 48 may have a gear reduction ratio of greater than about 2.3 and the low pressure turbine 46 may have a pressure ratio that is greater than about five (5). In various embodiments, the bypass ratio of the gas turbine engine 20 is greater than about ten (10:1). In various embodiments, the diameter of the fan 42 may be significantly larger than that of the low pressure compressor 44, and the low pressure turbine 46 may have a pressure ratio that is greater than about five (5:1). The low pressure turbine 46 pressure ratio may be measured prior to the inlet of the low pressure turbine 46 as related to the pressure at the outlet of the low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared engine, such as a geared turbofan, or non-geared engine, such as a turbofan, a turboshaft, or may comprise any gas turbine engine as desired.

In various embodiments, the low pressure compressor 44, the high pressure compressor 52, the low pressure turbine 46, and the high pressure turbine 54 may comprise one or more stages or sets of rotating blades and one or more stages or sets of stationary vanes axially interspersed with the associated blade stages but non-rotating about engine central longitudinal axis A-A'. The compressor and turbine sections 24, 28 may be referred to as rotor systems. Within the rotor systems of the gas turbine engine 20 are multiple rotor disks, which may include one or more cover plates or minidisks. Minidisks may be configured to receive balancing weights or inserts for balancing the rotor systems.

Figure 2A:
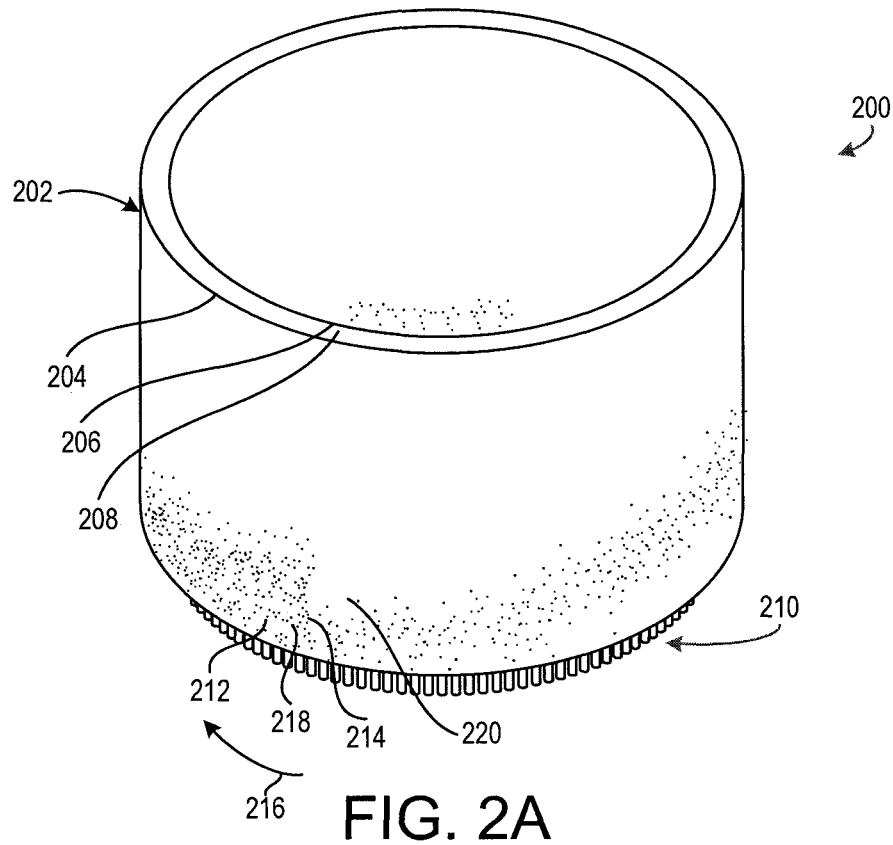
FIGS. 2A, 2B, and 2C are drawings illustrating various features of a rotating detonation engine, in accordance with various embodiments.
Figure 2B:
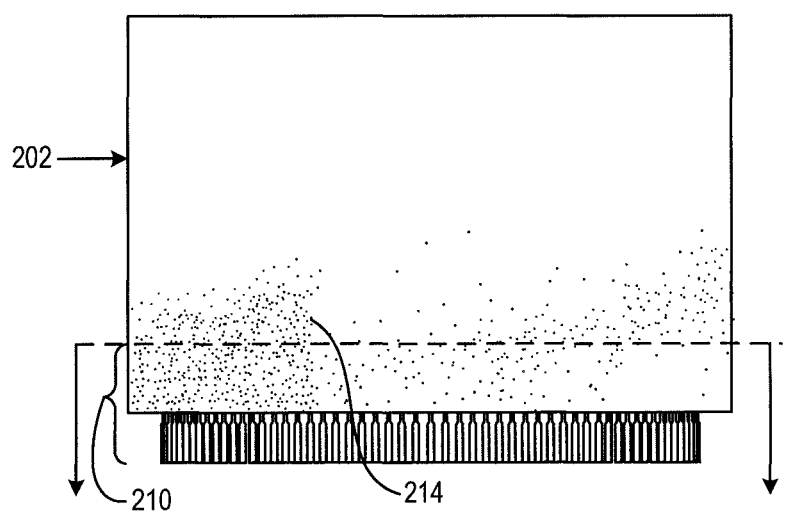
Figure 2C:
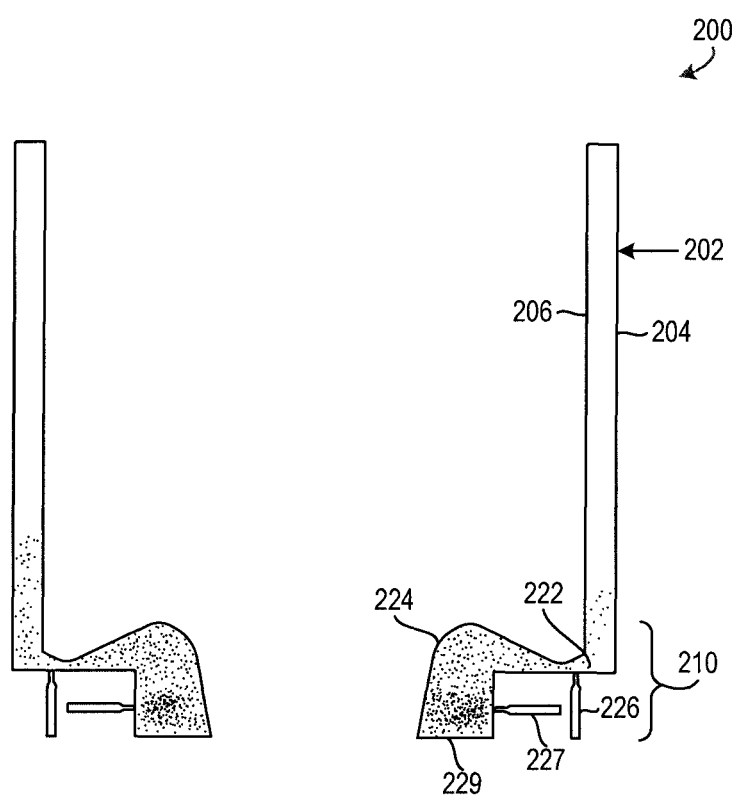

Referring now to FIGS. 2A, 2B, and 2C, the rotating detonation engine 200 may include an annulus 202 including an outer cylinder 204 and an inner cylinder 206. The outer cylinder 204 and the inner cylinder 206 may define an annular volume 208 therebetween. Although the rotating detonation engine 200 is shown as an annular structure, one skilled in the art will realize that a rotating detonation engine may have any shape that provides a continuous path for detonation to follow. For example, a rotating detonation engine may have an elliptical shape, a trapezoidal shape, or the like. In that regard, where used in this context, "annulus" may refer to any continuous circumferential channel having annular or any other shape such as trapezoidal or elliptical. Furthermore, where used herein, "annular volume" may likewise refer to any continuous circumferential channel having annular or any other shape such as trapezoidal or elliptical.

Furthermore, although the rotating detonation engine 200 is shown in use in a gas turbine engine, one skilled in the art will realize that a rotating detonation engine may be used as a combustor in any other system, such as a ramjet engine, an augmentor section of an engine, or the like.

A fuel mixer 210 may be positioned upstream (i.e., in the direction of exhaust) from the annulus 202 and may provide a fuel mixture 212 including a combustible blend of an oxidizer and a fuel. The fuel mixture 212 may be continuously introduced into the annular volume 208. The rotating detonation engine 200 may then be initialized, causing a detonation 214 to occur. The detonation 214 corresponds to an ignition or combustion of the fuel mixture 212 at a particular location about a circumference of the annulus 202.

The detonation 214 may then continuously travel around the circumference of the annulus 202. As shown in FIG. 2A, the detonation 214 may travel in a direction illustrated by an arrow 216. A first location 218 within the annular volume 208 and preceding the detonation 214 may include a relatively large density of the fuel mixture 212. As the detonation 214 reaches the first location 218, the density of the fuel mixture 212 allows the fuel mixture 212 to detonate.

After the detonation occurs, the fuel mixture 212 may be burned away and the force of the detonation 214 may temporarily resist entry of additional fuel mixture 212 into the annular volume 208. Accordingly, a second location 220 that has recently detonated may have a relatively low density of the fuel mixture 212. In that regard, the detonation 214 may continue to rotate about the annular volume 208 in the direction shown by the arrow 216.

The fuel mixer 210 may be designed to blend and output the fuel mixture 212. In particular, the fuel mixer 210 may include a combustion channel 222, a mixture channel 224, and a secondary outlet 226. The combustion channel 222, the mixture channel 224, and the secondary outlet 226 may each include a metal or other material capable of withstanding relatively high temperatures such as one or more of an austenitic nickel-chromium-based alloy such as that sold under the trademark Inconel® which is available from Special Metals Corporation of New Hartford, N.Y., USA, a stainless steel, or other material capable of withstanding the pressures and temperatures experienced by the corresponding one or more of the combustion channel 222, the mixture channel 224, or the secondary outlet 226.

Conventional rotating detonation engines typically include a single fuel channel that transports fuel, a single oxidizer channel that transports oxidizer, and a combustion channel in which the fuel and the oxidizer mix and combust. In that regard, a conventional rotating detonation engine may include an oxidizer channel in place of the mixture channel 224 and a fuel outlet in place of the secondary outlet 226. Such a configuration has disadvantages such as waste of fuel during combustion due to relatively poor mixing of the fuel and air.

The rotating detonation engine 200 may reduce such waste by pre-mixing some of the oxidizer and the fuel. In particular, the mixture channel 224 may receive some fuel and some oxidizer. The fuel and the oxidizer may at least partially mix together in the mixture channel 224. The mixture channel 224 may transport a first mixture of the fuel and the oxidizer.

For example, oxidizer may be provided by an oxidizer outlet 229 and fuel may be provided by a fuel outlet 227. However, it may be undesirable for the detonation to occur within the mixture channel 224 as such detonation may shorten the lifespan of the mixture channel 224. In that regard, the first mixture of the fuel and the oxidizer within the mixture channel 224 may have a first fuel-air equivalence ratio that is greater than 1 or less than 1 (i.e., corresponding to a relatively lean or a relatively rich mixture, a fuel-air equivalence ratio is denoted in the drawings as $\varphi$). Accordingly, the first mixture of the fuel and the oxidizer may be too lean or too rich to detonate based on the characteristics of the mixture channel 224.

The likelihood of any fuel-air equivalence ratio of the first mixture detonating within the mixture channel 224 may be based on characteristics such as an oxidizer type of the oxidizer, a fuel type of the fuel, a pressure experienced at the mixture channel 224, and a temperature experienced at the mixture channel. In that regard, the first air fuel equivalence ratio may be selected based on such characteristics to reduce the likelihood of detonation within the mixture channel 224.

The secondary outlet 226 may output a supplemental mixture of the fuel and the oxidizer. The supplemental mixture of the fuel and the oxidizer may include oxidizer only, fuel only, or a mixture of the fuel and the oxidizer. For example, the secondary outlet 226 may output a fuel. The secondary outlet 226 and the mixture channel 224 may be positioned upstream from the combustion channel 222. The supplemental mixture of the fuel and the oxidizer may have a supplemental fuel-air equivalence ratio that is greater than or less than 1.

The first mixture from the mixture channel 224 and the supplemental mixture from the secondary outlet 226 may combine in the combustion channel 222 as the final mixture of the fuel and the air. The final fuel-air equivalence ratio of the final mixture may be closer to 1 than either the first mixture or the supplemental mixture. The final mixture may be capable of detonation within the combustion channel 222 and/or the annular volume 208. In that regard, the rotating detonation may reside in the combustion channel 222.

As shown in FIG. 2C, the combustion channel 222 may be at least partially defined by the annulus 202 such that the combustion channel 222 includes at least a portion of the annular volume 208. In various embodiments and with reference to FIG. 4, a combustion channel 422 of a fuel mixer 410 may be located upstream from an annulus 402 of a rotating detonation engine 400. In that regard, a mixture channel 424 may supply a mixture of an oxidizer and a fuel, and a secondary outlet 426 may provide a supplemental mixture that includes one or more of the oxidizer or the fuel. The mixture channel 424 and the secondary outlet 426 may both be positioned upstream from the combustion channel 422. Likewise, the combustion channel 422 may be positioned upstream from the annulus 402.

Figure 3A:
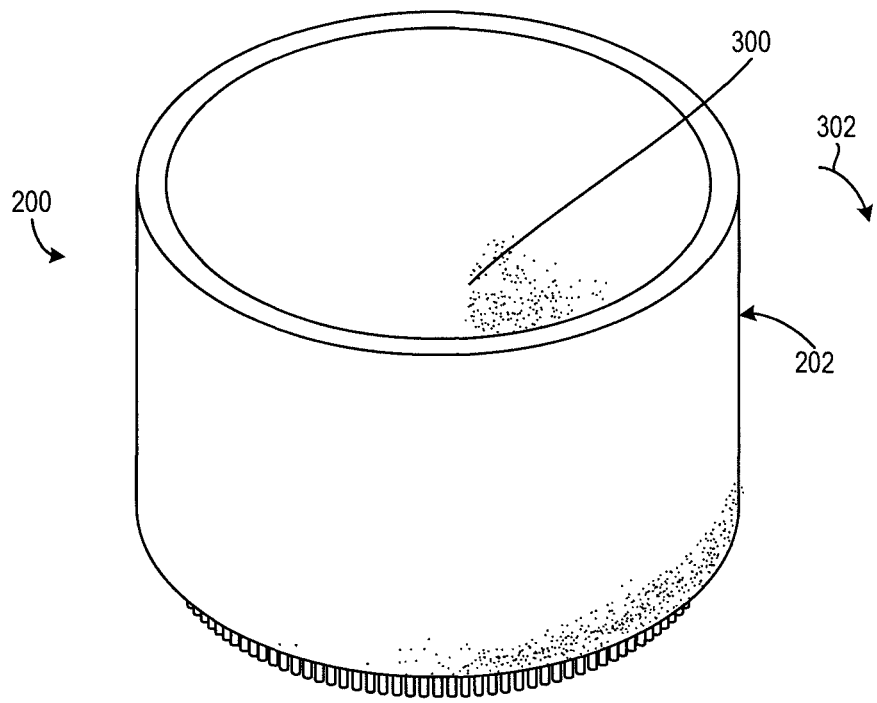
FIGS. 3A, 3B, and 3C are drawings illustrating rotation of the detonation of the rotating detonation engine of FIGS. 2A, 2B, and 2C, in accordance with various embodiments.
Figure 3B:
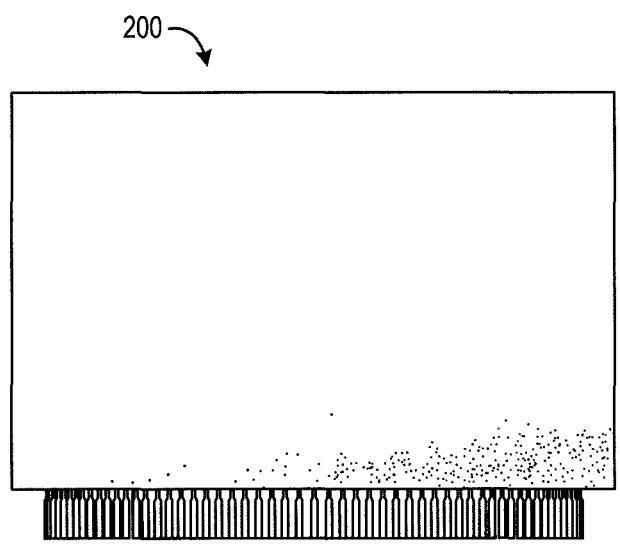
Figure 3C:
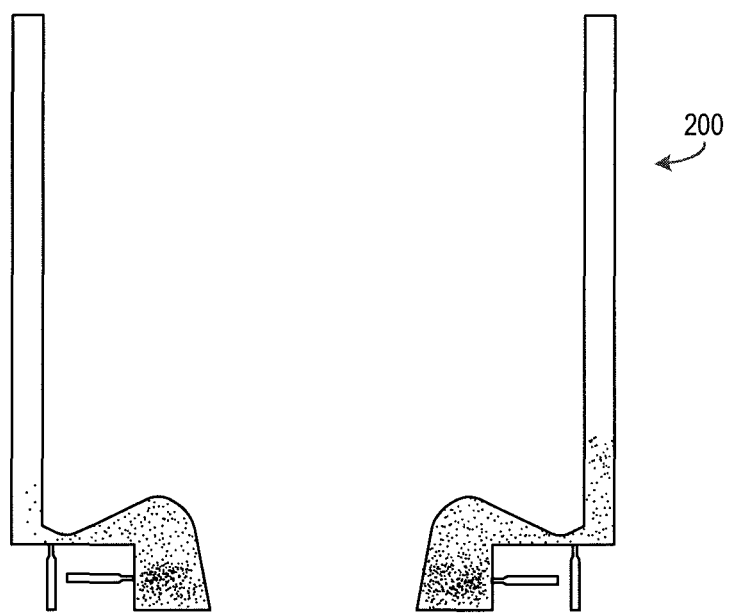

Referring now to FIGS. 3A, 3B, and 3C, the rotating detonation engine 200 is shown at a point in time later than shown in FIGS. 2A, 2B, and 2C. In particular, the rotating detonation engine 200 now has a detonation 300 at a different location than the detonation 214 of FIG. 2. As shown, the detonation 300 continues to travel counterclockwise about the annulus 202 as shown by an arrow 302. In various embodiments, a detonation of a rotating detonation engine may travel clockwise, counterclockwise, or both without departing from the scope of the present disclosure. In various embodiments, multiple detonation waves of the rotating detonation engine 200 may travel simultaneously in the combustion channel.

Figure 4:
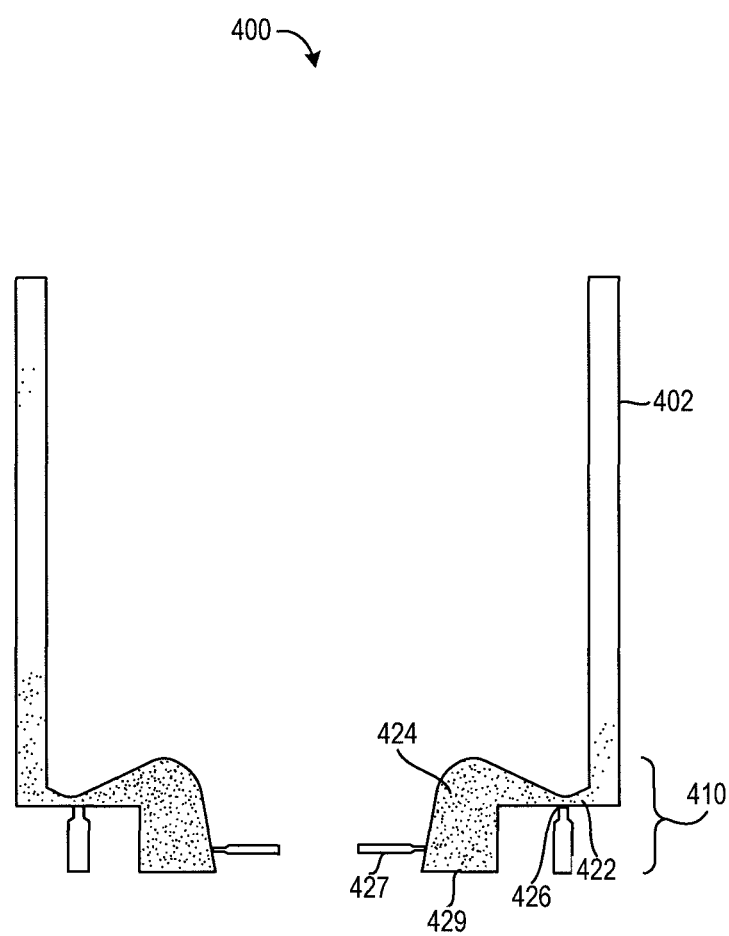
FIG. 4 is a drawing illustrating a rotating detonation engine having a different fuel mixer than the rotating detonation engine of FIGS. 2A, 2B, and 2C, in accordance with various embodiments.

Turning to FIG. 4, the mixture channel 424 may receive oxidizer from an oxidizer outlet 429 and fuel from a fuel outlet 427. The secondary outlet 426 may output additional oxidizer.

Turning now to FIG. 5A, an exemplary fuel mixer 500 is shown which represents a single stage fuel injection and dual stage air injection configuration. The fuel mixer 500 includes a combustion channel 502 in which the mixture of fuel and oxidizer may be detonated or travel downstream. The final mixture of the fuel and the oxidizer may have a fuel-air equivalence ratio that is sufficiently close to 1 that the final mixture may combust or detonate within a corresponding rotating detonation engine.

A mixture channel 504 may transport a first mixture having all of the fuel and some of the oxidizer. A first fuel-air equivalence ratio of the first mixture is greater than 1. As shown in FIG. 5A, the first fuel-air equivalence ratio is greater than 1, meaning that the first fuel-air equivalence ratio is relatively rich. The oxidizer of the first mixture may be provided via a first oxidizer outlet 506. A first fuel outlet 508 may provide the fuel for the first mixture.

The fuel mixer 500 may further include a secondary outlet 510. The secondary outlet 510 may be designed to output a supplemental mixture having oxidizer. As shown in FIG. 5A, the secondary outlet 510 outputs the oxidizer without the fuel. In that regard, the fuel mixer 500 may correspond to the fuel mixer 410 of FIG. 4.

The secondary outlet 510 provides the supplemental mixture via a secondary channel 512. The mixture channel 504 and the secondary channel 512 are both upstream from the combustion channel 502. In that regard, the mixture channel 504 and the secondary channel 512 transport the first mixture and the supplemental mixture, respectively, to the combustion channel 502.

Turning now to FIG. 5B, an alternative fuel mixer 520 is shown which represents a single stage oxidizer injection and dual stage fuel injection configuration. The fuel mixer 520 includes a combustion channel 522 in which the fuel and oxidizer may detonate or travel downstream.

The fuel mixer 520 further includes a mixture channel 524 for transporting a first mixture of fuel and oxidizer. The first mixture may receive all of the oxidizer from an oxidizer outlet 526 and may receive some of the fuel from a fuel outlet 528. As shown in FIG. 5B, the first mixture may have a fuel-air equivalence ratio that is less than 1.

The fuel mixer 520 may further include a secondary outlet 530 that outputs a supplemental mixture of the fuel. As shown in FIG. 5B, the secondary outlet 530 may output fuel only without oxidizer. Thus, the supplemental mixture may increase the fuel-air equivalence ratio of the final mixture, resulting in a final fuel-air equivalence ratio that is sufficiently close to 1 so as to be combustible within the corresponding rotating detonation engine. In that regard, the fuel mixer 520 may correspond to the fuel mixer 210 of FIG. 2C.

Turning now to FIG. 5C, another fuel mixer 540 is shown which represents a dual stage fuel injection and dual stage air injection configuration. The fuel mixer 540 includes a combustion channel 542 that receives a combustible mixture of fuel and oxidizer. A mixture channel 544 transports a first mixture of fuel and oxidizer. A first oxidizer outlet 546 outputs some, but not all, of the oxidizer into the mixture channel 544, and a first fuel outlet 548 outputs some, but not all, of the fuel into the mixture channel 544. The oxidizer and fuel from the first oxidizer outlet 546 and the first fuel outlet 548 may mix together to form a first mixture. As shown in FIG. 5C, the first mixture may have a first fuel-air equivalence ratio that is greater than 1 (i.e., relatively rich).

The fuel mixer 540 further includes a secondary channel 552. The secondary channel 552 may transport a supplemental mixture of fuel and oxidizer. In particular, a second oxidizer outlet 554 may provide some, but not all, of the oxidizer to the secondary channel 552 and a second fuel outlet 556 may provide some, but not all, of the fuel to the secondary channel 552. The oxidizer from the second oxidizer outlet 554 and the fuel from the second fuel outlet 556 may combine to form the supplemental mixture of fuel and oxidizer. The supplemental mixture of air and fuel may have a fuel-air equivalence ratio that is less than 1 (i.e., relatively lean) and may be output by a secondary outlet 550.

The first mixture of fuel and oxidizer from the mixture channel 544 may combine with the supplemental mixture of fuel and oxidizer from the secondary channel 552 at the secondary outlet 550 to form the final mixture of fuel and oxidizer that has a fuel-air equivalence ratio that is sufficiently close to 1 to facilitate combustion or detonation.

Turning now to FIG. 5D, another fuel mixer 560 is shown which represents a dual stage fuel injection and three stage air injection configuration. The fuel mixer 560 may include similar features as the fuel mixer 540 of FIG. 5C. In particular, the fuel mixer 560 may include a combustion channel 562 that receives a combustible mixture of fuel and oxidizer. A mixture channel 564 transports a first mixture of fuel and oxidizer. A first oxidizer outlet 566 outputs some, but not all, of the oxidizer into the mixture channel 564, and a first fuel outlet 568 outputs some, but not all, of the fuel into the mixture channel 564. The oxidizer and fuel from the first oxidizer outlet 566 and the first fuel outlet 568 may mix together to form a first mixture. As shown in FIG. 5D, the first mixture may have a first fuel-air equivalence ratio that is greater than 1. In some embodiments, the first mixture may be relatively rich, indicating that it has a fuel-air equivalence ratio that is sufficiently greater than 1 that it is unlikely to detonate or combust in its environment.

The fuel mixer 560 further includes a secondary channel 572. The secondary channel 572 may transport a supplemental mixture of fuel and oxidizer. In particular, a second oxidizer outlet 574 may provide some, but not all, of the oxidizer to the secondary channel 572, and a second fuel outlet 576 may provide some, but not all, of the fuel to the secondary channel 572. The oxidizer from the second oxidizer outlet 574 and the fuel from the second fuel outlet 576 may combine to form the supplemental mixture of fuel and oxidizer. The supplemental mixture of fuel and oxidizer may have a fuel-air equivalence ratio that is less than 1 and may be output by a secondary outlet 570. In various embodiments, the supplemental mixture may be relatively lean, indicating that the fuel-air equivalence ratio of the supplemental mixture is sufficiently low that the supplemental mixture is unlikely to detonate or combust in its environment.

The first mixture of fuel and oxidizer from the mixture channel 564 may combine with the supplemental mixture of fuel and oxidizer from the secondary channel 572 at the secondary outlet 570 form a semifinal mixture of fuel and oxidizer. As shown in FIG. 5D, the semifinal mixture of fuel and oxidizer has a fuel-air equivalence ratio that is greater than 1 (i.e., relatively rich).

The fuel mixer 560 further includes a tertiary outlet 578 that is positioned upstream from the combustion channel 562. The tertiary outlet 578 may output a tertiary mix of fuel and oxidizer that includes at least one of fuel or oxidizer. As shown in FIG. 5D, the tertiary outlet 578 outputs oxidizer without fuel. The oxidizer from the tertiary outlet 578 may travel through a tertiary channel 580 where it combines with the semifinal mixture of fuel and oxidizer to form the final mixture of fuel and oxidizer that is combustible.

Use of any of the fuel mixers disclosed herein provides advantages over conventional systems. Due to the relatively high frequency of detonation revolutions per second, conventional systems may have difficulty in providing a well-mixed mixture of fuel and oxidizer. Due to the pre-mixing of at least some of the fuel and oxidizer disclosed herein, the final mixture of fuel and oxidizer output by any of the fuel mixers disclosed herein may be relatively well mixed, providing for relatively even detonations throughout the rotating detonation engine. Furthermore, ratios of premixed fuel and oxidizer may be selected such that a fuel-air equivalence ratio is sufficiently far from 1 to reduce the likelihood of detonation in any mixture channels, thus reducing the likelihood of combustion in undesirable conditions and increasing the life of the fuel mixer.

While the disclosure is described with reference to exemplary embodiments, it will be understood by those skilled in the art that various changes may be made and equivalents may be substituted without departing from the spirit and scope of the disclosure. In addition, different modifications may be made to adapt the teachings of the disclosure to particular situations or materials, without departing from the essential scope thereof. The disclosure is thus not limited to the particular examples disclosed herein, but includes all embodiments falling within the scope of the appended claims.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of a, b, or c" is used in the claims, it is intended that the phrase be interpreted to mean that a alone may be present in an embodiment, b alone may be present in an embodiment, c alone may be present in an embodiment, or that any combination of the elements a, b and c may be present in a single embodiment; for example, a and b, a and c, b and c, or a and b and c. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A fuel mixer for mixing a fuel and an oxidizer prior to detonation in a rotating detonation engine, comprising:
    a combustion channel configured to transport a final mixture of the fuel and the oxidizer to an unobstructed annulus in which a rotating detonation wave travels at least one of clockwise or counterclockwise along an entire circumference of the annulus for combustion in the annulus;
    an inner annulus located radially inward from the unobstructed annulus and configured to transport at least a portion of the oxidizer towards the unobstructed annulus of the combustion channel;
    a first fuel outlet configured to transport a first portion of the fuel;
    a second fuel outlet positioned downstream from the first fuel outlet and configured to transport a second portion of the fuel;
    a mixture channel positioned upstream from the combustion channel and the unobstructed annulus and downstream from the inner annulus, at least partially located in the inner annulus, and configured to receive the first portion of the fuel from the first fuel outlet and to transport a first mixture having the first portion of the fuel and at least some of the oxidizer;
    a transport channel extending from the inner annulus to the combustion channel and configured to transport the first mixture having the first portion of the fuel and the at least some of the oxidizer; and
    a secondary outlet positioned upstream from the combustion channel and the unobstructed annulus and configured to output a supplemental mixture of the fuel and the oxidizer that includes at least one of the fuel or the oxidizer into the transport channel such that the first mixture and the supplemental mixture combine in the combustion channel to form the final mixture.

2. The fuel mixer of claim 1, wherein the first mixture has a first fuel-air equivalence ratio that is greater than or less than 1 and the final mixture has a second fuel-air equivalence ratio that is closer to 1 than the first fuel-air equivalence ratio.

3. The fuel mixer of claim 1, wherein the combustion channel is defined by the unobstructed annulus of the rotating detonation engine.

4. The fuel mixer of claim 1, wherein the combustion channel provides a volume for the final mixture to be combined prior to circumferential passage of the rotating detonation wave.

5. The fuel mixer of claim 1, wherein the mixture channel is positioned upstream from the secondary outlet, the first mixture has a first fuel-air equivalence ratio, and a difference between the first fuel-air equivalence ratio and 1 is sufficiently great that the first mixture fails to detonate upstream from the secondary outlet.

6. The fuel mixer of claim 1, further comprising at least one tertiary outlet positioned upstream from the combustion channel and configured to transport at least one tertiary mixture of the fuel and the oxidizer that includes at least one of the fuel or the oxidizer such that the first mixture, the supplemental mixture, and the tertiary mixture combine in the combustion channel to form the final mixture.

7. The fuel mixer of claim 1, wherein the first mixture has a first fuel-air equivalence ratio that is selected based on an oxidizer type of the oxidizer, a fuel type of the fuel, a pressure experienced at the mixture channel, and a temperature experienced at the mixture channel.

8. A rotating detonation engine, comprising:
    an unobstructed annulus configured to receive a final mixture of a fuel and an oxidizer such that a rotating detonation wave in the unobstructed annulus travels at least one of clockwise or counterclockwise along an entire circumference of the unobstructed annulus for combustion in the unobstructed annulus;
    an inner annulus located radially inward from the unobstructed annulus and configured to transport at least a portion of the oxidizer towards the unobstructed annulus of the combustion channel;
    a combustion channel configured to fill with the final mixture of the fuel and the oxidizer for combustion in the unobstructed annulus;
    a first fuel outlet configured to transport a first portion of the fuel;
    a second fuel outlet positioned downstream from the first fuel outlet and configured to transport a second portion of the fuel;
    a mixture channel positioned upstream from the combustion channel and the unobstructed annulus and downstream from the inner annulus, at least partially located in the inner annulus, and configured to receive the first portion of the fuel from the first fuel outlet and to transport a first mixture having the first portion of the fuel and at least some of the oxidizer;
a transport channel extending from the inner annulus to the combustion channel and configured to transport the first mixture having the first portion of the fuel and the at least some of the oxidizer; and
a secondary outlet positioned upstream from the combustion channel and the unobstructed annulus and configured to output a supplemental mixture of the fuel and the oxidizer that includes at least one of the fuel or the oxidizer into the transport channel such that the first mixture and the supplemental mixture combine in the combustion channel to form the final mixture.

9. The rotating detonation engine of claim 8, wherein the first mixture has a first fuel-air equivalence ratio that is greater than or less than 1 and the final mixture has a second fuel-air equivalence ratio that is closer to 1 than the first fuel-air equivalence ratio.

10. The rotating detonation engine of claim 8, wherein the combustion channel is defined by the unobstructed annulus of the rotating detonation engine.

11. The rotating detonation engine of claim 8, wherein the combustion channel provides a volume for the final mixture to be combined prior to circumferential passage of the detonation.

12. The rotating detonation engine of claim 8, wherein the mixture channel is positioned upstream from the secondary outlet, the first mixture has a first fuel-air equivalence ratio, and a difference between the first fuel-air equivalence ratio and 1 is sufficiently great that the first mixture fails to detonate upstream from the secondary outlet.

13. The rotating detonation engine of claim 8, further comprising at least one tertiary outlet positioned upstream from the combustion channel and configured to transport at least one tertiary mixture of the fuel and the oxidizer that includes at least one of the fuel or the oxidizer such that the first mixture, the supplemental mixture, and the tertiary mixture combine in the combustion channel to form the final mixture.

14. The rotating detonation engine of claim 8, wherein the first mixture has a first fuel-air equivalence ratio that is determined based on an oxidizer type of the oxidizer, a fuel type of the fuel, a pressure experienced at the mixture channel, and a temperature experienced at the mixture channel.

15. A gas turbine engine, comprising:
a turbine section configured to convert exhaust into torque;
a compressor section configured receive the torque from the turbine section and to utilize the torque to compress fluid; and
a rotating detonation engine configured to generate the exhaust and having:
an unobstructed annulus configured to receive a final mixture of a fuel and an oxidizer such that a rotating detonation wave in the unobstructed annulus travels at least one of clockwise or counterclockwise along an entire circumference of the unobstructed annulus for combustion in the unobstructed annulus,
an inner annulus located radially inward from the unobstructed annulus and configured to transport at least a portion of the oxidizer towards the unobstructed annulus of the combustion channel,
a combustion channel configured to fill with the final mixture of the fuel and the oxidizer for combustion in the unobstructed annulus,
a first fuel outlet configured to transport a first portion of the fuel,
a second fuel outlet positioned downstream from the first fuel outlet and configured to transport a second portion of the fuel,
a mixture channel positioned upstream from the combustion channel and the unobstructed annulus and downstream from the inner annulus, at least partially located in the inner annulus, and configured to receive the first portion of the fuel from the first fuel outlet and to transport a first mixture having the first portion of the fuel and at least some of the oxidizer,
a transport channel extending from the inner annulus to the combustion channel and configured to transport the first mixture having the first portion of the fuel and the at least some of the oxidizer, and
a secondary outlet positioned upstream from the combustion channel and the unobstructed annulus and configured to output a supplemental mixture of the fuel and the oxidizer that includes at least one of the fuel or the oxidizer into the transport channel such that the first mixture and the supplemental mixture combine in the combustion channel to form the final mixture.

16. The gas turbine engine of claim 15, wherein the mixture channel is positioned upstream from the secondary outlet, the first mixture has a first fuel-air equivalence ratio, and a difference between the first fuel-air equivalence ratio and 1 is sufficiently great that the first mixture fails to detonate upstream from the secondary outlet.

17. The gas turbine engine of claim 15, wherein the rotating detonation engine further includes at least one tertiary outlet positioned upstream from the combustion channel and configured to transport at least one tertiary mixture of the fuel and the oxidizer that includes at least one of the fuel or the oxidizer such that the first mixture, the supplemental mixture, and the tertiary mixture combine in the combustion channel to form the final mixture.

* * * * *